United States Patent
Lanigan et al.

(10) Patent No.: US 12,553,831 B2
(45) Date of Patent: Feb. 17, 2026

(54) DOUBLET DETECTION IN GEMSTONES

(71) Applicant: De Beers UK Ltd, London (GB)

(72) Inventors: Peter Lanigan, Berkshire (GB); Colin McGuinness, London (GB)

(73) Assignee: De Beers UK Ltd, London (GB)

( * ) Notice: Subject to any disclaimer, the term of this patent is extended or adjusted under 35 U.S.C. 154(b) by 495 days.

(21) Appl. No.: 17/791,143

(22) PCT Filed: Jan. 6, 2021

(86) PCT No.: PCT/EP2021/050140
§ 371 (c)(1),
(2) Date: Jul. 6, 2022

(87) PCT Pub. No.: WO2021/140128
PCT Pub. Date: Jul. 15, 2021

(65) Prior Publication Data
US 2023/0027883 A1    Jan. 26, 2023

(30) Foreign Application Priority Data
Jan. 7, 2020   (GB) .................................... 2000189

(51) Int. Cl.
*G01N 21/87* (2006.01)
*G01N 21/64* (2006.01)
*G01N 21/88* (2006.01)

(52) U.S. Cl.
CPC ............ *G01N 21/87* (2013.01); *G01N 21/64* (2013.01); *G01N 21/6408* (2013.01);
(Continued)

(58) Field of Classification Search
CPC ...................................................... G01N 21/87
See application file for complete search history.

(56) References Cited

U.S. PATENT DOCUMENTS

| | | | |
|---|---|---|---|
| 6,014,208 A * | 1/2000 | Welbourn | G01N 21/87 356/237.1 |
| 2001/0023925 A1 | 9/2001 | Smith | |
| 2002/0008925 A1 | 1/2002 | Ravich et al. | |

FOREIGN PATENT DOCUMENTS

| | | |
|---|---|---|
| CN | 1196120 A | 10/1998 |
| CN | 1196121 A | 10/1998 |

(Continued)

OTHER PUBLICATIONS

International Preliminary report on Patentability for Application No. PCT/EP2021/050140, mailed on Jul. 21, 2022, 9 pages.
(Continued)

*Primary Examiner* — Carolyn Fin
(74) *Attorney, Agent, or Firm* — Sheppard Mullin Richter & Hampton LLP (57) ABSTRACT

A method of characterising a composition of a gemstone comprises irradiating an upper portion and a lower portion of the gemstone with one or more pulses of ultraviolet radiation at a wavelength of substantially 225 nm or less; capturing luminescence emitted by the upper portion of the gemstone and luminescence emitted by the lower portion of the gemstone in one or more time windows having a predetermined relationship with the or each pulse; and comparing properties of the captured luminescence from the upper and lower portions. A composition of the gemstone is characterised, based upon the comparison.

21 Claims, 8 Drawing Sheets

(52) U.S. Cl.
CPC ... *G01N 21/643* (2013.01); *G01N 2021/6413* (2013.01); *G01N 2021/8841* (2013.01)

(56) References Cited

FOREIGN PATENT DOCUMENTS

| CN | 105352929 A | 2/2016 |
|---|---|---|
| CN | 107771280 A | 3/2018 |
| CN | 107923852 A | 4/2018 |
| EP | 1720003 A1 | 11/2006 |
| WO | 97/04302 A1 | 2/1997 |
| WO | 2017/001835 A1 | 1/2017 |

OTHER PUBLICATIONS

International Search Report and Written Opinion for Application No. PCT/EP2021/050140, mailed on Apr. 15, 2021, 13 pages.
Search Report for Application No. GB2000189.7, mailed on Mar. 25, 2020, 3 pages.
First Examination Report for Chinese Application No. 202180019105.X, mailed on Apr. 18, 2025, 16 pages.

* cited by examiner

Type Ia Natural Diamond:

Figure 4a

Culet Fluorescence    Culet Short Phosphorescence

Table Fluorescence    Table Short Phosphorescence

Standard Purity CVD Crown / Natural Diamond Pavilion:

Figure 4b

Culet Fluorescence    Culet Short Phosphorescence

Table Fluorescence    Table Short Phosphorescence

Natural

HP CVD Doublet

DOUBLET DETECTION IN GEMSTONES

CROSS-REFERENCE TO RELATED APPLICATIONS

This application is a national phase application of International Patent Application No. PCT/EP2021/050140, filed on Jan. 6, 2021, which is based on and claims priority to and benefits of British Patent Application No. 2000189.7, filed on Jan. 7, 2020. The entire content of all of the above-identified applications is incorporated herein by reference.

TECHNICAL FIELD

The present invention relates to a method of and an apparatus for characterising a composition of a gemstone based on a comparison of luminescence properties of the crown and pavilion. In particular, although not exclusively, the present invention relates to the identification of colourless/near colourless diamond doublets.

BACKGROUND

Figure 1A:
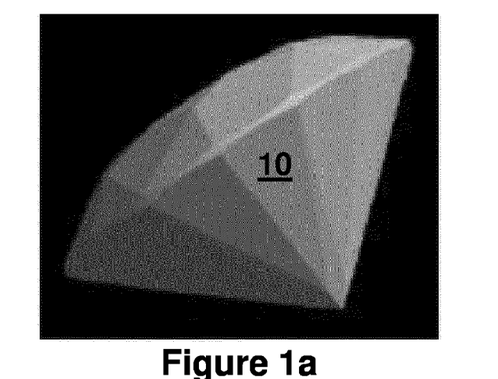
FIG. 1a illustrates a natural cut gemstone.
Figure 1B:
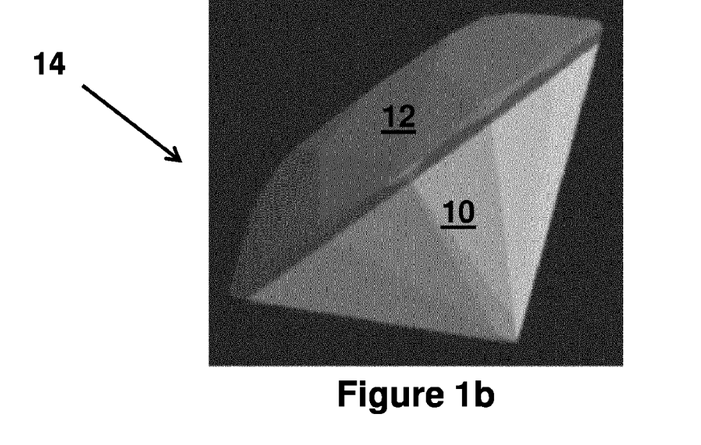
FIG. 1b illustrates a doublet.
Figure 1C:
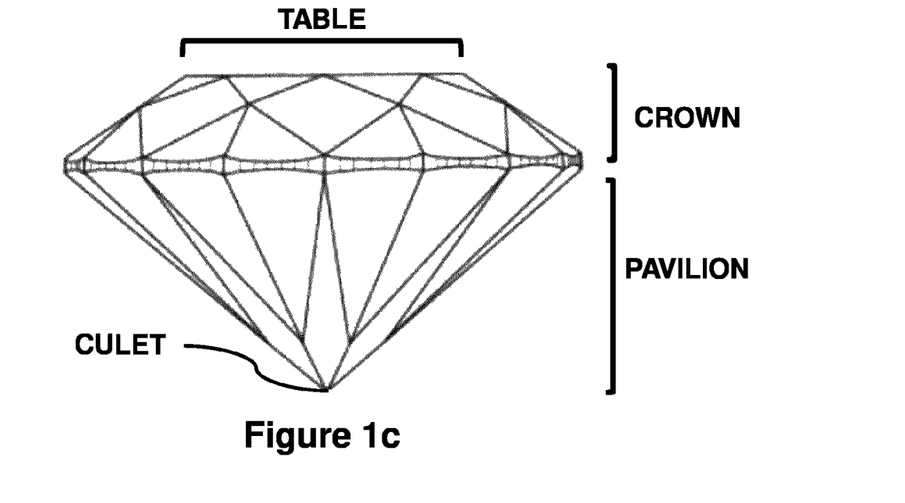
FIG. 1c illustrates aspects of a cut gemstone.

A major concern in the gemstone (and in particular, the diamond) industry is the presence of undisclosed synthetics, including hybrid and doublet stones. A doublet is essentially a synthetic stone grown onto or otherwise attached to a natural cut stone. For example, as illustrated in FIGS. 1a and 1b, a natural stone pavilion 10 may be augmented by the addition of a synthetic stone—in this case, a chemical vapour deposition (CVD) crown 12—to form a composite, or doublet 14. In addition to a combination of a natural pavilion with a synthetic crown, as illustrated in FIG. 1b, doublets may also consist of a natural crown with a synthetic pavilion. The various elements of a cut gemstone (table, crown, pavilion, culet) are further illustrated in FIG. 1c.

Augmenting a natural stone with a synthetic layer or overgrowth may be carried out to change the natural stone's colour (for example, to cause a colourless natural stone to appear blue by the addition of a boron-doped synthetic layer), or to exploit price breaks (for example, by bringing the natural stone's weight up to 0.5 or 1 carat). Doublets comprising a synthetic CVD overgrowth of 740 microns thickness have been reported.

The ability to identify diamonds which are pure synthetics has been largely addressed by the development of deep UV imaging instruments, such as DiamondView™ and SYNTHdetect™, via knowledge of natural diamond signatures. The identification of doublets poses a greater challenge, however, since they may pass initial screening, e.g. via the detection of the natural signature and so may never be referred for testing by more advanced screening instruments such as DiamondView. In particular, while fancy coloured (e.g. blue) stones could be referred to DiamondView for further testing due to their higher value and rarity, this is less likely to happen with colourless stones which may undergo bulk screening in SYNTHdetect.

It would therefore be desirable to develop effective screening for doublets, in particular for type IIa/IaAB diamonds. Such screening would preferably detect synthetic material present on the crown or pavilion of the stone.

SUMMARY OF INVENTION

In one aspect of the present invention there is provided a method of characterising a composition of a gemstone. The method comprises: irradiating an upper portion and a lower portion of the gemstone with one or more pulses of ultraviolet radiation at a wavelength of substantially 225 nm or less; capturing luminescence emitted by the upper portion of the gemstone and luminescence emitted by the lower portion of the gemstone in one or more time windows having a predetermined relationship with the or each pulse; comparing properties of the captured luminescence from the upper and lower portions; and characterising a composition of the gemstone, based upon the comparison. Said properties may comprise luminescence colour.

One of the one or more time windows may start immediately after an end of the or each pulse and closes between about 50 and 100 ms later, optionally 80 ms later, so that the luminescence comprises phosphorescence.

One of the one or more time windows may start 100 μs after the end of the or each pulse and closes less than 10 ms later, optionally 5 ms later and wherein the luminescence comprises phosphorescence.

One of the one or more time windows may start during the or each pulse and closes before the end of the or each pulse, and wherein the luminescence comprises fluorescence.

The method may comprise generating colour images of luminescence emitted by the upper portion of the gemstone and luminescence emitted by the lower portion of the gemstone.

The method may comprise displaying said colour images to a user in combination, optionally via a display screen.

The method may comprise generating pixel values for luminescence emitted by the upper portion of the gemstone and luminescence emitted by the lower portion of the gemstone, and optionally generating a ratio of blue to green pixels. The method may then comprise determining whether the ratio decreases over a predetermined time window.

The method may comprise determining whether the properties of the captured luminescence from the upper portion substantially match the properties of the captured luminescence from the lower portion.

The method may comprise characterising the gemstone as natural when the properties match, and characterising the gemstone as part natural, part synthetic when the properties do not match.

The method may comprise characterising the gemstone as natural when the properties match and are both consistent with those of natural diamond.

In another aspect of the present invention there is provided a method of comparing a colour of luminescence emitted by a crown and by a pavilion of a gemstone under ultraviolet excitation, said method comprising identifying said gemstone as a doublet where the luminescence colour of the crown and the pavilion do not match. Optionally, said gemstone is a diamond.

In a further aspect of the present invention there is provided an apparatus for characterising a composition of a gemstone, the apparatus comprising: a source of ultraviolet radiation configured to irradiate an upper and a lower portion of the gemstone with one or more pulses of ultraviolet radiation at a wavelength of substantially 225 nm or less; an image capture device configured to capture luminescence emitted by the upper portion of the gemstone and luminescence emitted by the lower portion of the gemstone; a controller configured to synchronise the source and image capture device so as to capture luminescence emitted by the upper and lower portions of the gemstone in one or more time windows having a predetermined relationship with the one or more pulses; and a processor configured to determine properties of the captured luminescence from the upper and lower portions and to present said properties for comparison.

Said ultraviolet source may directly irradiate a first surface of the gemstone, said apparatus further comprising a prism configured to direct ultraviolet radiation to a second surface of the gemstone that faces away from said source. Said prism may define a triangular portion, said triangular portion defining a shelf for supporting the gemstone on said second surface.

The prism may be formed from a single piece of material, and wherein optionally said material comprises high grade UV fused silica.

The shelf may be configured to support a plurality of gemstones simultaneously.

The apparatus may comprise a baffle configured to shutter the source of ultraviolet radiation such that one of the upper portion of the gemstone or the lower portion of the gemstone is irradiated at any one time.

The prism may comprise a pillar portion defining a concave upper surface, said pillar portion adjacent said shelf.

The prism may be configured to direct ultraviolet radiation received at the concave upper surface through the pillar and triangular portions to the second surface of the gemstone.

The apparatus may comprise a re-focusing mechanism configured to focus the image capture device on either the upper or the lower portion of the gemstone.

The apparatus may comprise a rotation mechanism configured to rotate the gemstone by 180°.

DETAILED DESCRIPTION OF DRAWINGS

FIG. 8b is a plan view of the prism of FIG. 8a.

DETAILED DESCRIPTION

Figure 2:
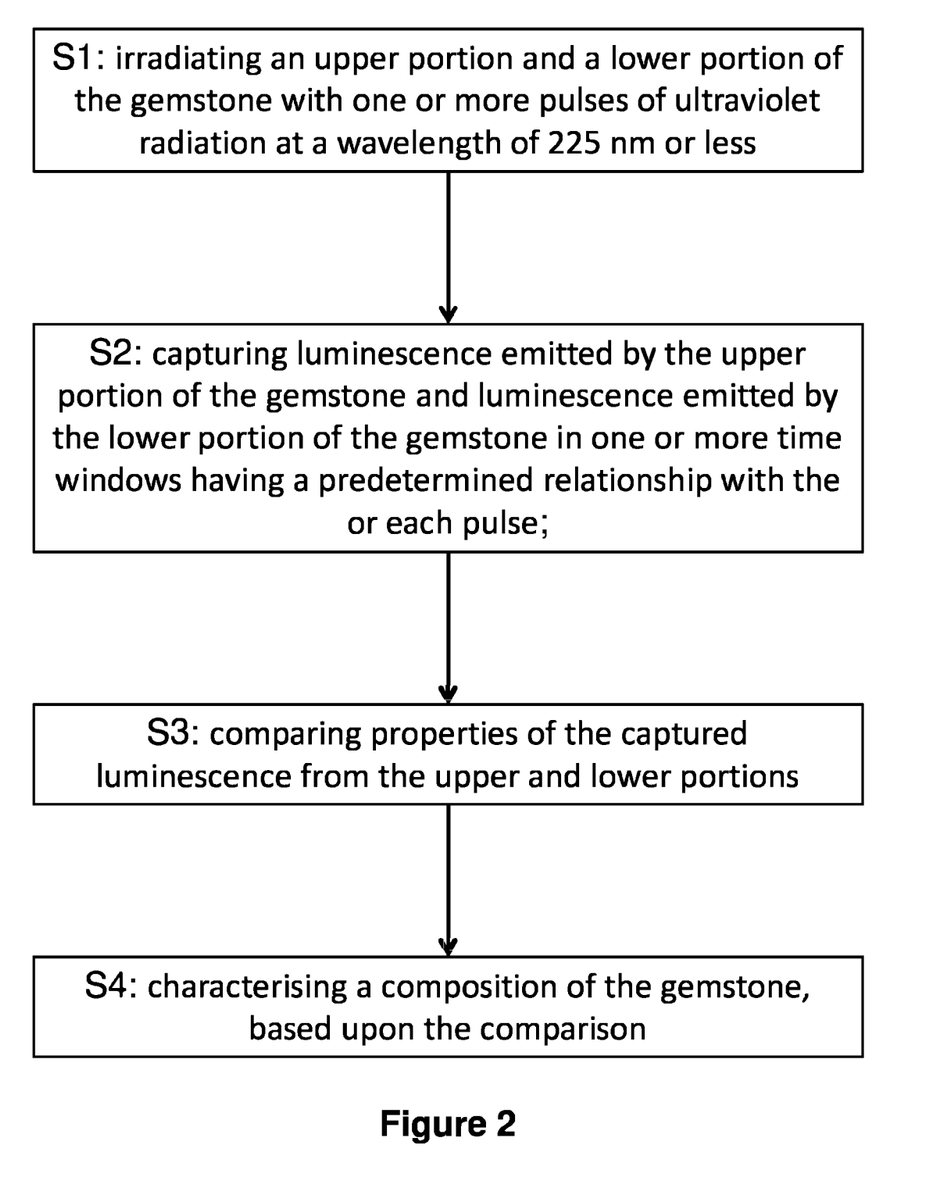
FIG. 2 is a flow chart of a method of characterising a composition of a gemstone.

Described herein with reference to FIGS. 1 to 8 is a method for characterising a composition of a gemstone. As illustrated in FIG. 2, the method comprises irradiating an upper portion and a lower portion of the gemstone with one or more pulses of ultraviolet radiation at a wavelength of about 225 nm or less; capturing luminescence emitted by the upper portion and luminescence emitted by the lower portion of the gemstone in one or more time windows having a predetermined relationship with the or each pulse; comparing properties of the captured luminescence from the upper and lower portions; and characterising a composition of the upper and lower portions of the gemstone, based upon the comparison. An apparatus for carrying out the above method is also described.

The use of specific luminescence markers in diamond, detected within a specific time window following or during an ultraviolet (UV) excitation pulse, is detailed in WO2017/001835. A microsecond pulse of energy of 225 nm or less excites surface luminescence from the stone. If the excitation pulse and imaging device are synchronised, a specific delay can be applied to an imaging device such that only delayed luminescence is captured, and any prompt luminescence is 'gated out'. This enables the capture of luminescence that would otherwise have been swamped by the prompt luminescence.

Specifically, luminescence in a window that opens just after the excitation pulse ends and closes some tens of milliseconds (ms) (for example around 80-100 ms) later, in a wavelength band peaking at around 455 nanometres (nm), is an indicator of the majority of natural type Ia or IIa diamonds. In WO2017/001835, this luminescence is described as a blue fast phosphorescence marker. Further luminescence markers in a variety of time windows are also described.

In the context of SYNTHdetect, standard purity CVD may be defined as showing a level of delayed luminescence other than blue (e.g. orange for NV or turquoise for boron) whereas high purity CVD will be inert in delayed luminescence.

In the case of standard purity CVD material overlaid on natural diamond, the CVD layer will exhibit a luminescence in this 80 ms time window, but this luminescence will be different to the blue fast phosphorescence exhibited by a natural stone. In one embodiment, a method of characterising a composition of a gemstone makes use of this difference. The method comprises determining whether a CVD layer of standard (or higher) purity is present. The method covers a case where the CVD layer is present in an upper portion (i.e. the crown), or where the CVD layer is present in a lower portion (i.e. the pavilion) of a stone.

In the case of very high purity CVD diamond material overlaid on natural diamond, the blue fast phosphorescence marker will be observable from the natural layer through the high purity CVD layer. In a further embodiment, the method of characterising a composition of a gemstone comprises using further properties of the emitted luminescence to determine whether a CVD layer of very high purity is present in an upper portion (i.e. the crown) or a lower portion (i.e. the pavilion) of a stone.

While reference is made herein to luminescence emitted from the crown and/or the pavilion of a stone, such luminescence may also be regarded as being emitted by the table and/or the culet of the stone respectively, or simply from upper and lower portions of the stone.

A method of determining whether a CVD layer of standard purity is present in the crown, or in the pavilion, of a cut and polished gemstone, such as a diamond, will now be described. The method comprises imaging a crown and a pavilion of the stone under deep UV excitation (i.e. UV in the range 200 to 225 nm), and comparing luminescence emitted by the crown and the pavilion in a predetermined time window. In particular, the method enables determination as to whether the colour of the luminescence emitted by the crown matches the luminescence emitted from the pavilion, in the same time window.

Figure 3:
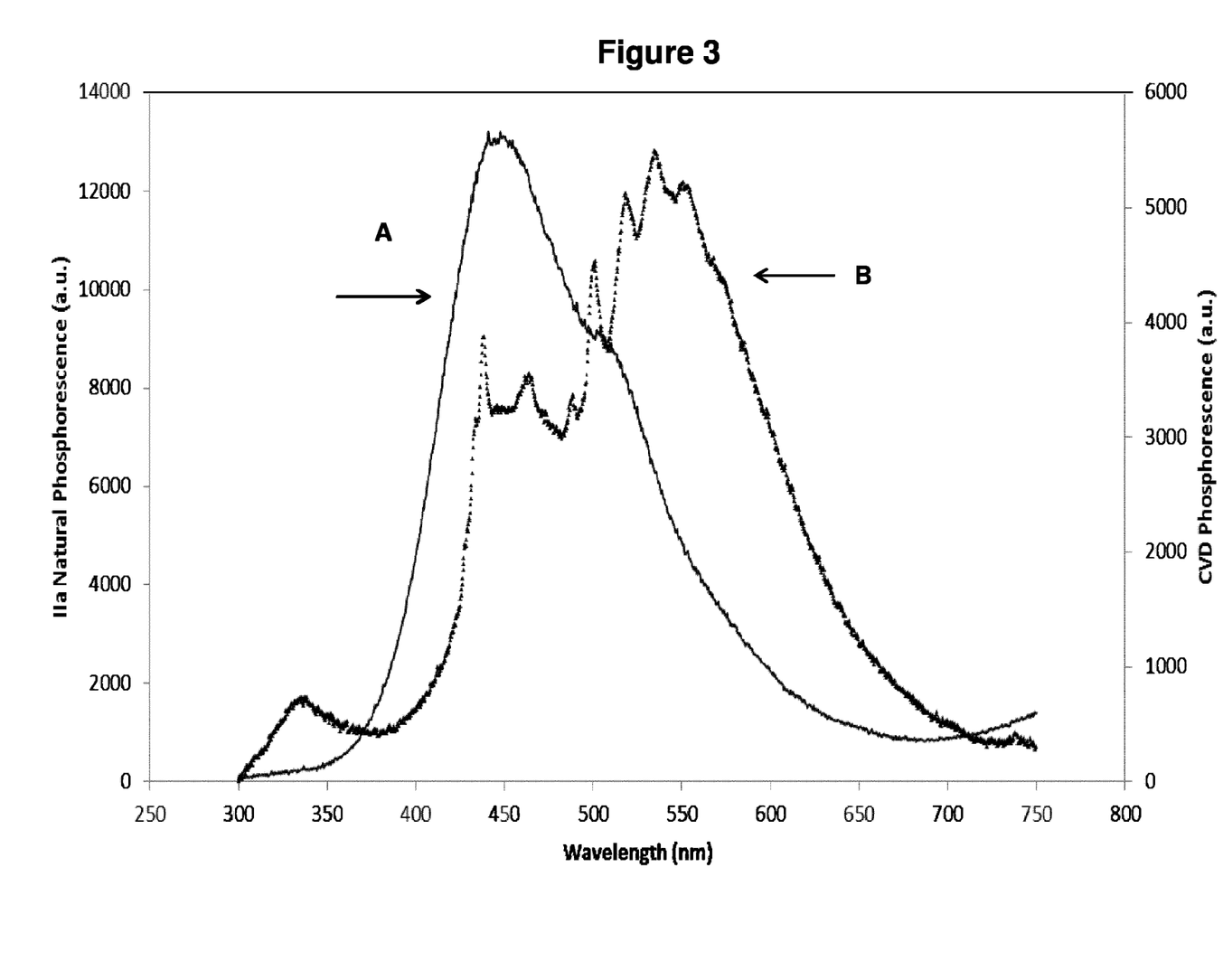
FIG. 3 is a graphical representation of short-lived phosphorescence spectra of a natural diamond and a CVD synthetic diamond.

FIG. 3 illustrates the difference in luminescence emitted by natural diamond and standard purity CVD under deep UV excitation in the 80 ms time window described above. A graphical representation is provided of the short-lived phosphorescence spectra of a natural diamond (sample A) and a CVD synthetic diamond (sample B). Both samples A, B are round brilliant cut and less than 1 carat.

As shown in FIG. 3, spectrum A is the short-lived phosphorescence spectrum of the natural diamond sample A under deep UV excitation. Spectrum B is the short-lived phosphorescence spectrum of the synthetic CVD diamond sample B under deep UV excitation. Both samples exhibit short-lived phosphorescence that occurs for less than 100 milliseconds after removal of the source of electromagnetic radiation. Both samples A, B therefore emit phosphorescence in the 80 ms time window described above.

However, this spectral analysis demonstrates that the short-lived or fast blue phosphorescence produced by diamond sample A is blue, broad and peaks at around 450 nm. In contrast, spectrum B demonstrates that the synthetic CVD diamond sample B exhibits weaker, short-lived or fast green phosphorescence, which peaks at around 530 nm to around 550 nm.

A comparison of luminescence (e.g. fast phosphorescence) emitted by the crown and pavilion of a cut stone (which is assumed to be natural diamond) in the same time window using the same excitation source can therefore indicate whether the entire stone is in fact formed of natural diamond material, in which case the luminescence for the crown and pavilion will be the same (will "match"), or whether the stone comprises a crown or pavilion formed from a layer of CVD diamond, in which case the luminescence for the crown and pavilion will be different to one another (will not "match"). In this context, a "match" comprises the values of red, green, blue, or any of their ratios, being within a pre-determined range.

In determining whether the luminescence images for the crown and pavilion are a match or not, the colour of emitted luminescence may be compared. Differences in the colour of luminescence emitted by the crown and the pavilion, in the same time window, may be indicative of two or more portions of the stone having different compositions.

Figure 4A:
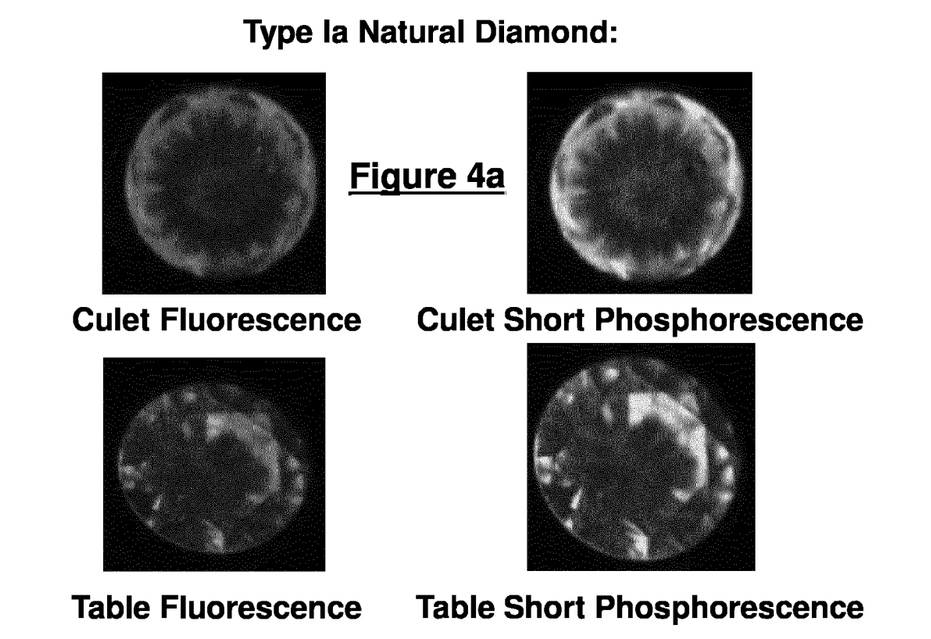
FIG. 4a illustrates luminescence images obtained for a natural Type Ia cut diamond.

FIG. 4a illustrates luminescence images obtained for a natural Type Ia cut diamond. Imaged fluorescence emitted by the crown (table) and the pavilion (culet) of the diamond in the same time window are a match in terms of colour. Similarly, imaged short or fast phosphorescence emitted by the crown and the pavilion in an 80 ms time window are a match in terms of colour. Comparison of the luminescence images for the upper (crown/table) portion of the stone and the lower (culet/pavilion) portion of the stone therefore enable the identification of the stone as a natural diamond.

Figure 4B:
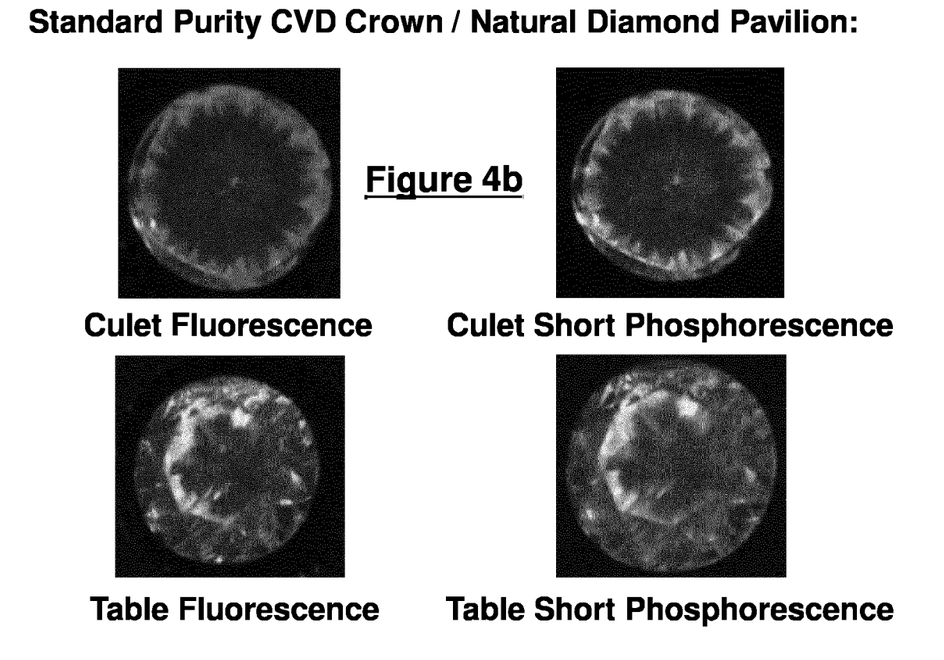
FIG. 4b illustrates luminescence images obtained for a cut diamond comprising a natural diamond pavilion and a standard purity CVD crown.

FIG. 4b illustrates luminescence images obtained for a cut diamond comprising a natural diamond pavilion and a standard purity CVD crown. Imaged fluorescence emitted through the crown (table) and the pavilion (culet) of the stone are not a match in terms of colour, i.e. the colour of the crown and pavilion fluorescence is visibly different. Similarly, imaged short or fast phosphorescence emitted by the crown and the pavilion in the 80 ms time window are not a match in terms of colour. Comparison of the luminescence images for the upper (crown/table) portion of the stone and the lower (culet/pavilion) portion of the stone therefore enable the identification of the stone as a potential doublet.

Similar differences in the colour of luminescence emitted by the crown and the pavilion of a stone may be detected in the case of a doublet comprising a standard purity CVD pavilion and a natural diamond crown/table. For a higher purity CVD pavilion, crown and pavilion phosphorescence may be a match, however, fluorescence emitted by the pavilion/culet may be noticeably red in colour, and therefore the crown and pavilion fluorescence are not a match, and can be used to detect the presence of a doublet.

The above-described method for determining whether a CVD layer of standard/higher purity is present in the crown or pavilion of a cut and polished stone may be used to identify loose stones as doublets comprising either a CVD crown/natural pavilion or a natural crown and a CVD pavilion.

In contrast to standard purity CVD, in the case where very high purity CVD diamond material is overlaid on natural diamond, blue fast phosphorescent light emitted from the natural stone may pass through the high purity CVD layer and therefore be visible from both the top and bottom of the stone. This is because very high purity CVD is substantially inert to deep UV excitation and therefore does not luminesce to any great extent. As a result, light in blue fast phosphorescence emitted by the natural diamond passes through the CVD layer and is detected in the 80 ms time window for both the top and bottom of the stone.

The blue fast phosphorescence marker in the 80 ms time window is therefore less useful in determining whether very high purity CVD is present. Similarly, where very high purity CVD is present the fluorescence emitted by the crown and pavilion may also match.

A further method, which can be used to determine whether a CVD layer of very high purity is present in the crown or pavilion of a stone, will now be described. This method enables the observation of subtle differences in the luminescence markers when comparing a natural type Ia diamond with a natural type Ia diamond overlaid with high purity CVD material (i.e. a natural diamond Ia pavilion/culet overlaid by a CVD crown or table).

In this method, images of luminescence emitted by the crown and pavilion (upper and lower portions) of a gemstone may be processed to determine a ratio of blue to green pixels. This ratio may be presented in a graphical form such that any changes in this ratio over time can be observed.

Figure 5:
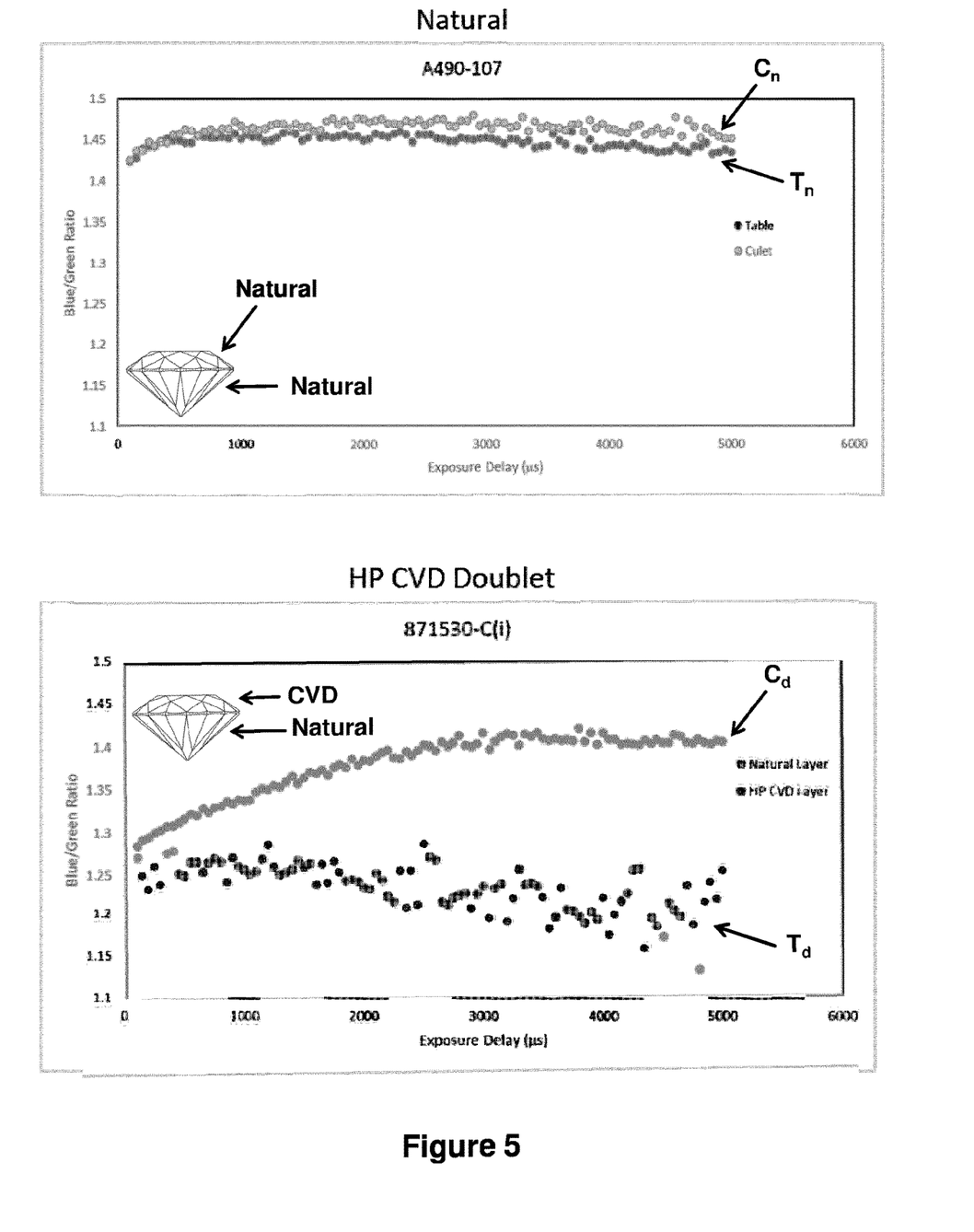
FIG. 5 compares the ratio of blue/green pixels for a natural Ia diamond with the ratio of blue/green pixels for a stone comprising a CVD crown and natural diamond pavilion.

FIG. 5 is a comparison of the change of ratio of blue to green pixels for the crown and pavilion of a wholly natural Ia diamond with the ratio of blue to green pixels for a second stone, in which a very high purity CVD crown or table is overlaid on a natural Ia diamond pavilion. In this case, it is assumed that the second stone is positioned such that the deep UV excitation source and image capture device (camera) are facing the table facet of the second stone, i.e. the CVD crown is closest to both the excitation source and the camera.

In this specific example, for both stones the exposure time was 15 ms and the capture delay was increased from 100 µs to 5 ms in 50 µs steps.

It can be seen that, in the case of the natural diamond, the ratio of blue to green pixel values for the crown $T_n$ and the pavilion/culet $C_n$ phosphorescence was very similar (around 1.45) and remained fairly constant throughout the time window. In other words, the blue/green ratio for the crown and the pavilion substantially match.

In contrast, in the case of the second stone comprising a very high purity CVD crown and a natural diamond pavilion, it can be seen that the ratio of blue to green phosphorescence for the crown/table $T_d$ (CVD) and the pavilion/ culet $C_d$ (natural diamond) differs over the same exposure time. In other words, the blue/green ratio for the crown and the pavilion do not match. Although both crown and culet phosphorescence initially display substantially the same ratio of blue to green, over time the CVD $T_d$ crown phosphorescence shifts from a blue/green ratio of just under 1.3 at the start of the time window to a blue/green ratio of under 1.2 at the end of the time window.

In other words, the phosphorescence becomes less blue and more green. This "green shift" is not displayed by the natural diamond pavilion emission $C_d$, which displays a blue/green ratio of around 1.4 at the end of the time window.

The "green shift" displayed by the CVD crown under extended exposure times may arise as follows. Under deep UV excitation, with the table of the stone closest to the UV source, the CVD crown will behave as a UV filter, absorbing all energy of 225 nm and below within the first few microns of material depth. This energy will therefore not reach the natural diamond pavilion below the CVD overlay. In contrast, any wavelengths above 225 nm will penetrate further into the stone and so will reach the lower, natural diamond pavilion. Only a small quantity of energy above 225 nm will reach the natural pavilion, but this energy is sufficient to excite the blue fast phosphorescence marker within the lower natural layer.

However, due to the greater penetration depth of the above 225 nm excitation energy and the weak nature of the resulting phosphorescence emission, a greater level of absorption of the emissions within the stone will occur (self-absorption). This is in contrast to any emissions generated by direct excitation at the surface of the CVD crown, where little or no absorption occurs. The total luminescence from the CVD crown therefore comprises any phosphorescence emitted from the crown itself and phosphorescence emitted by the pavilion below.

Since very high purity CVD tends to be substantially inert (i.e. produces little or no luminescence) under deep UV excitation, the phosphorescence captured in the 100 µs to 5000 µs time window described above is likely to consist of phosphorescence emitted by the natural pavilion only. This weak phosphorescence may initially appear blue in colour, but over the extended time window will become greener as a result of, for example, self-absorption.

A comparison of the blue/green pixel ratio for crown and pavilion luminescence of a stone under deep UV excitation, in a time window of 100 µs to 5000 µs from the end of the excitation pulse, enables the identification of a doublet having a very high purity CVD crown.

The above-described method of comparing the blue/green pixel ratio may also be used in the case of a doublet comprising a type Ia natural diamond crown and a very high purity CVD pavilion.

Figure 6:
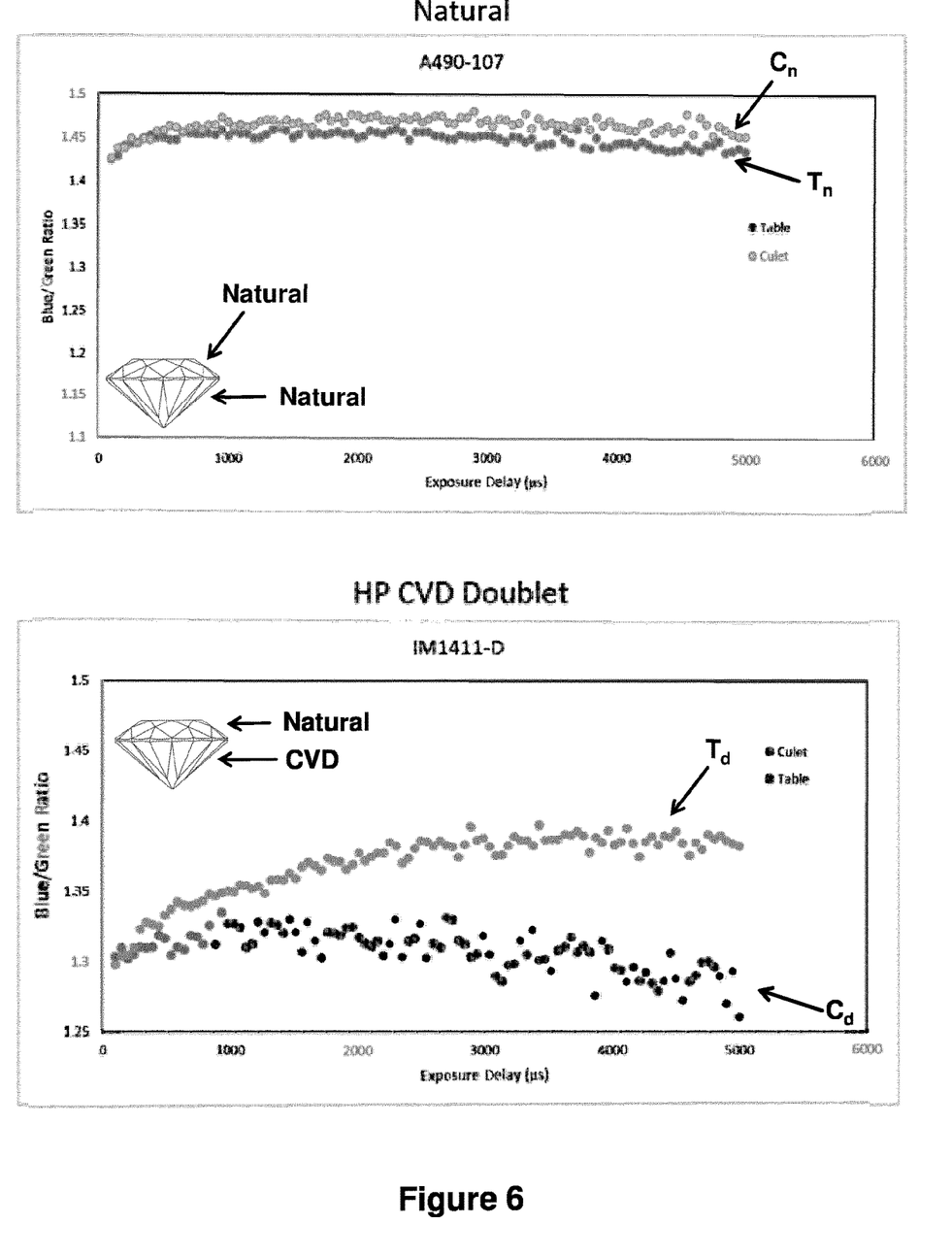
FIG. 6 compares the ratio of blue/green pixels for a natural Ia diamond with the ratio of blue/green pixels for a stone comprising a CVD pavilion and natural diamond crown.

As illustrated in FIG. 6, in this case, the "green shift" displayed by the very high purity CVD doublet in the 100 µs to 5000 µs time window is more subtle. The phosphorescence emitted by the natural Ia crown $T_d$ has a blue/green pixel ratio of around 1.3 at the start of the time window and around 1.4 at the close of the time window. On the other hand, the phosphorescence emitted by the very high purity CVD pavilion $C_d$ has a blue/green pixel ratio of around 1.3 at the start of the time window and around 1.275 at the close of the time window. The divergence between the blue/green pixel ratio of the crown $T_d$ and pavilion $C_d$ phosphorescence is therefore reduced in comparison to the doublet of FIG. 5.

This reduction in "green shift" may relate to the doublet of FIG. 6 comprising less CVD material than the doublet of FIG. 5. Less CVD material would allow a greater amount of above 225 nm excitation energy to penetrate through the CVD pavilion and into the Natural table.

An apparatus for carrying out the above methods will now be described. In one example, schematically illustrated in FIG. 7, the apparatus 100 comprises a prism 110, a source of UV excitation 120, a colour image capture device 130, a processor 140, a baffle 150, and a controller 160. A beam splitter 125 enables UV light to be delivered from the excitation source 120 towards the prism 110 through the baffle 150, and light returned from either side of the prism 110 to the image capture device 130. Additional illustrations of the prism 110 in perspective and plan views respectively are provided in FIGS. 8a and 8b.

In this example, the prism 110 is formed from a single piece of high grade UV Fused Silica (UVFS). The prism 110 comprises an L-shaped seat or shelf 112, a triangular portion 114 (shown below dotted line A in FIG. 7) and a pillar portion 116 (shown above dotted line A in FIG. 7). An upper surface of the pillar portion 116 defines a concavity 118. The sides of the prism 110 forming the apex of the triangular portion 114 may form an angle of substantially 90°. The concavity 118 of the pillar portion 116 may have a radius of approximately 31 mm. It will be appreciated, however, that these dimensions may vary according to the specific application.

Figure 7:
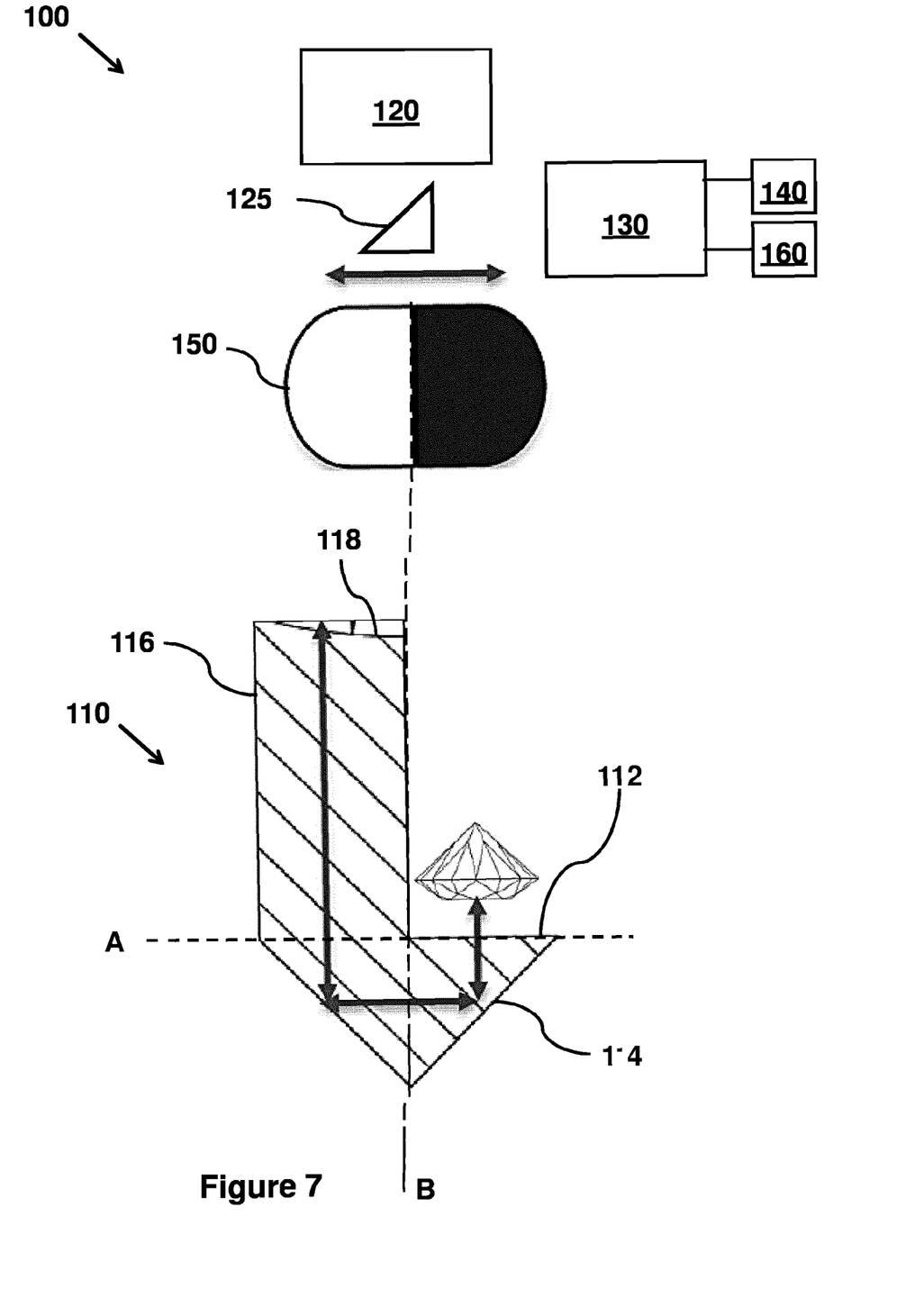
FIG. 7 is a schematic of an exemplary apparatus for carrying out the method of FIG. 2.
Figure 8A:
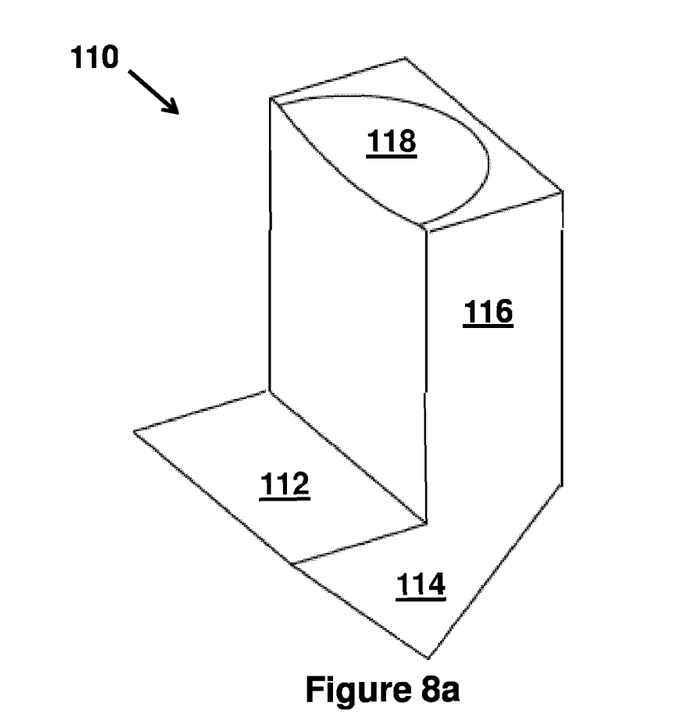
FIG. 8a is a perspective view of a prism for use in the apparatus of FIG. 7.
Figure 8B:
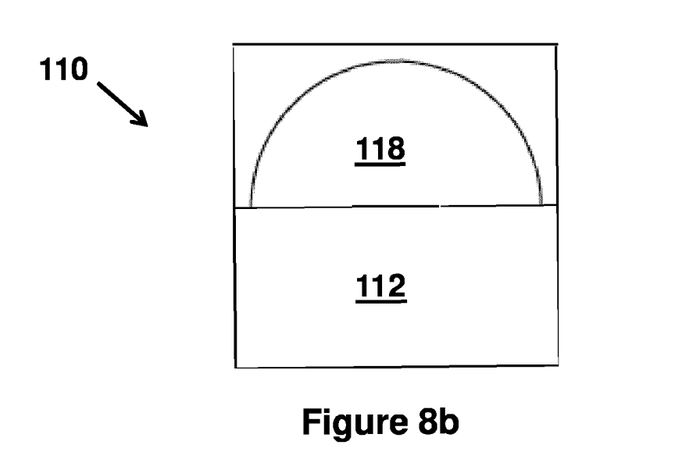

The L-shaped shelf 112 functions as a platform on which one or more loose stones to be imaged may be placed, table facet down. The triangular portion 114 directs the deep UV excitation from the UV source 120 to the bottom of the stone (i.e. its crown). The triangular portion 114 also directs the luminescence emitted by the stone to the image capture device 130. The pillar portion 116 and its concavity 118 act as a negative lens to bring the bottom of the stone into focus at the image capture device 130.

UV radiation substantially at 230 nm (i.e. above diamond band-gap excitation) is emitted by the UV source 120 to excite a surface of the stone positioned on the shelf 112. The UV source may emit radiation in microsecond pulses. This excitation may cause the stone to emit luminescence, depending upon the composition of the stone. The image capture device 130 is configured to capture this luminescence. In one example, focusing of the image capture device is obtained with a liquid lens or corrective optics.

In this example, the UV source 120 and the image capture device 130 are synchronised by the controller 160 such that the image capture device 130 begins capturing emitted luminescence at the end of the UV excitation pulse, and stops capturing emitted luminescence 80 ms later (although it will be appreciated that 80 ms is provided by way of example, and the window may be longer or shorter, e.g. as short around 50 ms or as long as around 100 ms). Thus, in this example, luminescence in the form of phosphorescence is captured in the 80 ms time window described above. Alternatively or additionally, the controller 160 may be configured to synchronise the image capture device 130 and UV source 120 so as to capture luminescence in the 100 µs to 5000 µs time window described above. Alternatively or additionally, the controller 160 may enable the capture of luminescence in further time windows having a predetermined relationship with the excitation pulse. For example, the image capture device may be set to capture luminescence emitted from the crown and/or the pavilion of the stone during a time window that closes prior to the end of the excitation pulse (i.e. to capture fluorescence).

Referring back to FIG. 7, a baffle 150 is mounted in front of a field iris of the image capture device 130. The baffle 150 is used to shutter the UV source 120 such that either the pillar portion 116 or the shelf 112 of the prism 110 is illuminated at any one time, but never both. In other words, the baffle 150 ensures that either the pavilion only or the crown only of the stone is illuminated by the UV source 120. This arrangement eliminates cross-talk caused by light leakage between the top and bottom portions of the stone. It will be appreciated that UV radiation from the UV source 120 illuminates the pavilion of the stone directly, i.e. without passing through the prism 110.

As a result, the field of view of the image capture device 130 contains either an image of the crown of the stone or an image of the pavilion of the stone, depending on the configuration of the baffle 150. In this example, the image of the pavilion of the stone is an affine transformed image. Both pavilion and crown images are in focus.

The apparatus 100 described above enables the image capture device 130 to sequentially capture one or more images of luminescence emitted by the crown and by the pavilion of one or more cut gemstones positioned on the shelf 112 of the prism 110. The captured images are transferred from the image capture device 130 to a processor 140.

In an embodiment, the processor 140 may perform image processing on the one or more luminescence images. For example, the processor 140 may inverse-transform the affine transformed image of the pavilion of the stone. The processor may pair up the inverse transformed pavilion image with the corresponding crown image for the same stone, captured in the same time window. Where multiple stones are being imaged at the same time, the paired images may comprise multiple crowns and multiple pavilions.

The processed images may then be displayed, for comparison and/or further analysis, to a user via a colour display screen (not shown here). Simultaneous display of the crown and pavilion luminescence colour images, captured using the same device with the stone in the same position, enables a user to conduct a direct comparison of the two images side by side.

Alternatively or additionally, the processor 140 may carry out image analysis on the captured luminescence images in order to determine whether the luminescence colour of the crown and pavilion images matches, or not. The processor 140 may provide an audible or visual indication to a user as to whether or not the luminescence colour is a match, based upon the image analysis.

Alternatively or additionally, the processor 140 may carry out image analysis on the captured luminescence images in order to generate a blue/green pixel ratio for the crown and pavilion luminescence images. In an embodiment, the ratios may be presented to a user in graphical form, optionally via a display screen. In an embodiment, the processor 140 may provide an audible or visual indication to a user as to whether or not and to what extent the pixel ratios diverge, based upon the image analysis.

Optionally, the apparatus 100 may be configured to carry out multiple excitation pulses and to capture multiple luminescence images within each time window. The images may be combined to produce a composite luminescence image. The apparatus 100 may be configured such that luminescence markers from different time windows are captured. Exemplary luminescence markers and associated time windows are described in WO2017/001835.

In an alternative embodiment of the apparatus 100, not shown here, the baffle may be omitted and the pavilion and crown may be illuminated sequentially, optionally by two or more UV sources.

The apparatus 100 as described above, with or without a baffle, may be incorporated into a conventional deep UV imaging instrument, such as SynthDetect.

It will be appreciated that the above-described prism may have alternative configurations. For example, the pillar portion may be omitted, as discussed below.

An alternative apparatus (not shown here) for determining whether a CVD layer of standard purity is present in the crown or pavilion of a cut and polished stone may comprise a catadioptric system, rather than the above-described stepped prism. In this case, it will be necessary to "flip" the stone in order to capture luminescence images of the crown and pavilion separately (i.e. to rotate the stone by 180°). Re-focusing of the image capture device between captures will also be required, using a re-focusing mechanism. The "flipping" and/or the re-focusing may be carried out manually or may be automated by a rotation mechanism. Re-focusing may be achieved by mounted the stone on a platform which can be raised and lowered with respect to the image capture device.

As a further alternative a simple prism may be used (i.e. without the pillar 116 and concave portion 118). The remaining elements shown in FIG. 7 may be left in place but the image capture device will need to be refocused between capturing images of the crown and the pavilion because of the different optical path lengths of light emitted by the stone.

Additionally (not shown here), a sample may be irradiated from the pavilion and luminescence imaged from the crown (or vice versa), and may be carried out with two light sources and two imaging devices, negating the need for a movable baffle and UV-grade quartz prism.

It will be appreciated that the methods described herein are not mutually exclusive but may be performed in combination.

As used herein, natural is defined as a stone, or material, from nature consisting exclusively of diamond, or other gemstone, produced by geological processes. The term natural, as defined herein, indicates that the stone or material is not synthetic.

As used herein, synthetic is defined as a man-made stone, or material, consisting exclusively of diamond, or other gemstone, produced by artificial or industrial processes, such as chemical vapour deposition (CVD) or high pressure high temperature (HPHT) processes.

As used herein, type is defined using the standard diamond classification system which separates diamonds based on their physical and chemical properties, e.g. type Ia, type IIb etc.

As used herein, fluorescence is a type of luminescence characterised as only being produced when the ultraviolet excitation is on, and phosphorescence is a type of luminescence that remains but decays away once the excitation is removed.

The images described herein are actual colour images of visible luminescence, and not spectroscopic images or images illustrating decay times.

The invention claimed is:

1. A method of characterising a composition of a gemstone, said composition comprising natural, or part natural, part synthetic, the method comprising:
   irradiating an upper portion and a lower portion of the gemstone with one or more pulses of ultraviolet radiation at a wavelength of 225 nm or less;
   capturing luminescence emitted by the upper portion of the gemstone and luminescence emitted by the lower portion of the gemstone in one or more time windows having a predetermined relationship with the one or more pulses;

generating pixel values for luminescence emitted by the upper portion of the gemstone and luminescence emitted by the lower portion of the gemstone;

generating a ratio of blue to green pixels;

comparing properties of the captured luminescence from the upper and lower portions; and characterising the composition of the gemstone, based upon the comparison.

2. The method as claimed in claim 1, wherein said properties comprise luminescence colour.

3. The method as claimed in claim 1, wherein one of the one or more time windows starts immediately after an end of the one or more pulses and closes between about 50 and 100 ms later, or 80 ms later, so that the luminescence comprises phosphorescence.

4. The method as claimed in claim 1, wherein one of the one or more time windows starts 100 us after the end of the one or more pulses and closes less than 10 ms later, or 5 ms later and wherein the luminescence comprises phosphorescence.

5. The method as claimed in claim 1, wherein one of the one or more time windows starts during the one or more pulses and closes before the end of the one or more pulses, and wherein the luminescence comprises fluorescence.

6. The method as claimed in claim 1, further comprising generating colour images of luminescence emitted by the upper portion of the gemstone and luminescence emitted by the lower portion of the gemstone.

7. The method as claimed in claim 6, further comprising displaying said colour images to a user in combination, or via a display screen.

8. The method as claimed in claim 1, further comprising determining whether the ratio decreases over a predetermined time window.

9. The method as claimed in claim 1, further comprising determining whether the properties of the captured luminescence from the upper portion match the properties of the captured luminescence from the lower portion.

10. The method as claimed in claim 9, further comprising characterising the gemstone as natural when the properties match, and characterising the gemstone as part natural, part synthetic when the properties do not match.

11. The method as claimed in claim 9, further comprising characterising the gemstone as natural when the properties match and are both consistent with those of natural diamond.

12. An apparatus for characterising a composition of a gemstone, said composition comprising natural, or part natural, part synthetic, the apparatus comprising:

a source of ultraviolet radiation configured to irradiate an upper and a lower portion of the gemstone with one or more pulses of ultraviolet radiation at a wavelength of 225 nm or less;

an image capture device configured to capture luminescence emitted by the upper portion of the gemstone and luminescence emitted by the lower portion of the gemstone;

a controller configured to synchronise the source and image capture device so as to capture luminescence emitted by the upper and lower portions of the gemstone in one or more time windows having a predetermined relationship with the one or more pulses; and a processor configured to:

generate pixel values for luminescence emitted by the upper portion of the gemstone and luminescence emitted by the lower portion of the gemstone;

generate a ratio of blue to green pixels;

determine properties of the captured luminescence from the upper and lower portions and present said properties for comparison.

13. The apparatus as claimed in claim 12, wherein the source of ultraviolet radiation directly irradiates a first surface of the gemstone, said apparatus further comprising a prism configured to direct ultraviolet radiation to a second surface of the gemstone that faces away from said source.

14. The apparatus as claimed in claim 13, wherein said prism defines a triangular portion, said triangular portion defining a shelf for supporting the gemstone on said second surface.

15. The apparatus as claimed in claim 14, wherein the prism is formed from a single piece of material, or wherein said material comprises high grade UV fused silica.

16. The apparatus as claimed in claim 14, wherein the shelf is configured to support a plurality of gemstones simultaneously.

17. The apparatus as claimed in claim 14, further comprising a baffle configured to shutter the source of ultraviolet radiation such that one of the upper portion of the gemstone or the lower portion of the gemstone is irradiated at any one time.

18. The apparatus as claimed in claim 14, wherein the prism comprises a pillar portion defining a concave upper surface, said pillar portion adjacent said shelf.

19. The apparatus as claimed in claim 18, wherein the prism is configured to direct ultraviolet radiation received at the concave upper surface through the pillar and triangular portions to the second surface of the gemstone.

20. The apparatus as claimed in claim 12, further comprising a re-focusing mechanism configured to focus the image capture device on either the upper or the lower portion of the gemstone.

21. The apparatus as claimed in claim 20, further comprising a rotation mechanism configured to rotate the gemstone by 180°.

* * * * *